May 12, 1970     W. S. POLLINGER ET AL     3,511,271

PRESSURE RELIEF VALVES

Filed Sept. 18, 1967

Inventors
WILLIAM SAMUEL POLLINGER
GEOFFREY LIONEL RYDER

By Jennings Bailey, Jr.
Attorney

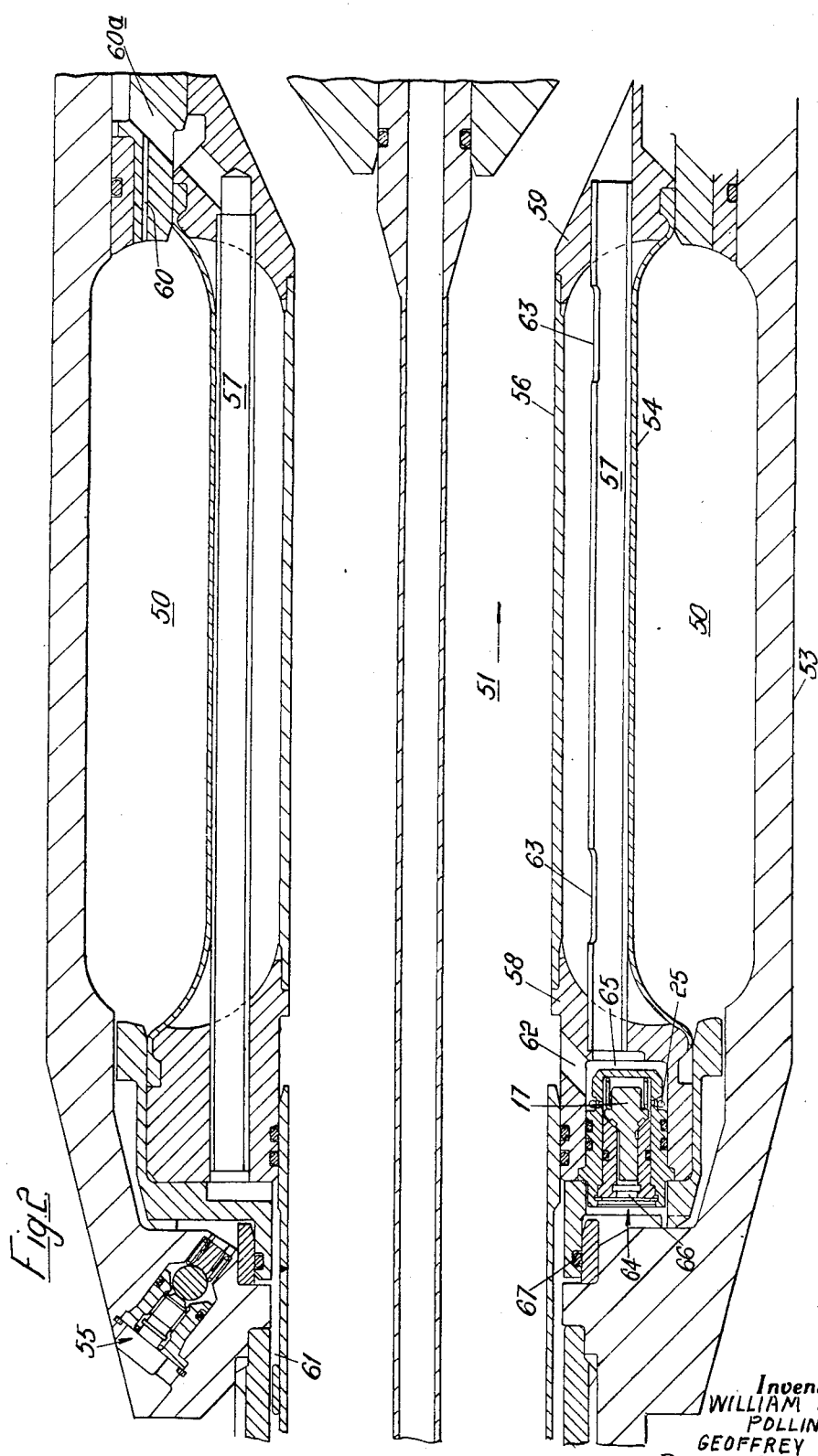

3,511,271
PRESSURE RELIEF VALVES
William Samuel Pollinger and Geoffrey Lionel Ryder, London, England, assignors to Bristol Siddeley Engines Limited, London, England, a British company
Filed Sept. 18, 1967, Ser. No. 668,577
Claims priority, application Great Britain, Sept. 19, 1966, 41,755/66
Int. Cl. F16k 15/06, 15/14
U.S. Cl. 137—512.3      4 Claims

ABSTRACT OF THE DISCLOSURE

A passage opening into a duct for abrasive or otherwise objectionable fluid contains, in series away from the duct, a one-way valve the valve member of which is constituted by an annulus of stretched elastomer, a space, and a pressure-relief valve, both the valves being arranged to open for flow towards the duct. The pressure-relief valve is a rigid valve member urged to closed position against a rigid seat by a spring located in the space.

---

This invention relates to constructions of pressure-relief valves and also to arrangements for protecting them from fluids which are harmful to them.

Apparatus according to this invention includes a duct for abrasive or otherwise objectionable fluid, and a passage opening into the duct, the passage containing, in series away from the duct, a one-way valve having a valve member constituted by, or actuated by, an annulus of stretch elastomer, a space, and a pressure-relief valve, both valves being arranged to open for flow towards the duct.

Examples of apparatus according to the invention will now be described with reference to the accompanying drawings of which:

FIG. 2 is a longitudinal section through an oil reservoir in a borehole drilling apparatus which is provided with a valve unit substantially as illustrated in FIG. 1.

Figure 1:
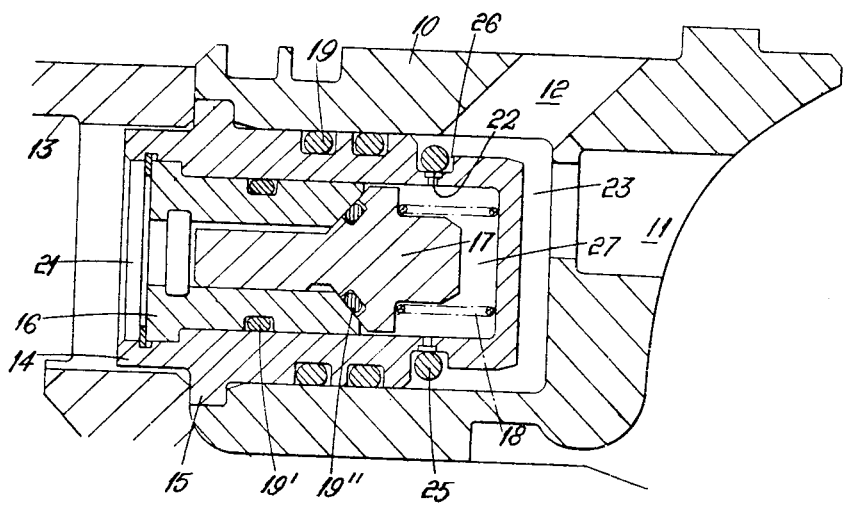
FIG. 1 is a longitudinal section through a valve unit.

Referring now to FIG. 1, a housing 10 having a passage 11 formed in its end wall and an inclined passage 12 formed in its side wall is arranged to abut at its open end against a flanged casing 13. The passage 12 leads to a duct for an abrasive fluid, as described more fully below, with reference to FIG. 2. A valve unit comprising an inner cup-shaped member 14, provided with a radial support flange 15 which is clamped between the housing 10 and casing 13, lies mainly within the housing 10. The cup 14 contains a metal liner 16, one end of which is bevelled to provide a seat for a metal pressure-relief valve member 17 of known kind. A coiled metal spring 18 within the cup 14 urges the valve member against its frusto-conical seat. O-ring seals 19, 19′, 19″ are carried by the cup 14, its liner 16 and the valve member 17. The cup 14 forms a chamber having an inlet passage 21 which at one end communicates with a fluid pressure system (not shown) and at its other end is controlled by the relief valve member 17. The wall of the cup 14 is provided with a number of circumferentially-spaced radial apertures 22 forming outlets from the chamber which can communicate via a space 23 with passages 11, 12.

In a typical application of the invention the internal fluid in the passage 21 is oil from a hydraulic or lubrication system which may become overpressurized and so require a bleed-off past the valve member 17. However, external fluid in the space 23 is an abrasive, corrosive or otherwise objectionable fluid from which it is important to protect the valve member 17, its seat, and its spring 18, in order to ensure satisfactory functioning of those elements which together provide a precision relief valve.

The apertures 22 are controlled by a one-way valve member constituted by a ring of resilient rubber 25 which is stretched to encircle the cup 14. The ring may be an O-ring of nitrile rubber. The stressed ring 25 normally seats firmly against the outer ends of the apertures 22. It is located by lying in a rectangular-section groove 26 formed in the external surface of the cup wall. The ring is a loose fit in the groove, and is not confined externally. The ring should not be overstretched in order to avoid static failure. It may for example be stretched to an internal diameter of about 1.2 times its free internal diameter.

When the oil pressure in the passage 21 rises sufficiently, it overcomes the closing force exerted by the spring 18, and the valve member 17, which is the more upstream of the two valves, opens and allows oil to enter the space 27 between the valve member 17 and the apertures 22. When the oil pressure in the space 27 exceeds the external pressure in the space 23 by more than the pressure exerted by the resilience of the ring valve member 25, it will force the latter from its seating and allows oil to escape through the apertures 22. As soon as the oil pressure in the space 27 drops sufficiently, the radially distorted ring will return and seal off the outlets once more. The pressure of the fluid in the space 23 will act to return the ring to its seating.

This arrangement provides a double protection for the upstream metal valve. Firstly the rubber ring 25 opposes entry of the external fluid into the apertures 22. Secondly the space 27 accommodates a body of oil interposed between the valve member 17 and the apertures 22, the spring 18 becoming immersed in a bath of oil.

The fit of the ring in the rectangular-section groove 26 allows the ring to flatten sideways under external pressure but there is a possible danger that part of the ring may be forced into the radial apertures 22 and become damaged. In a modification the groove is replaced by a V-section groove to avoid the above danger.

Referring to FIG. 2, a borehole drilling apparatus includes an annular hydraulic ram assembly (not shown) for varying the loading on the drilling bit, the ram piston being provided on its lower side with oil supplied from an annular reservoir 50 which surrounds a central duct 51 down which drilling fluid is pumped in the direction indicated by the arrow. FIG. 2 shows parts of the apparatus adjacent to the reservoir, the apparatus being on its side, with its lower end to the right, and the ram lying beyond the left margin of the figure. The reservoir extends radially between a reservoir casing 53 and a flexible inner wall 54 which can assume a corrugated shape. When the reservoir is filled with oil through a priming device 55 the wall 54 is distended inwards to lie in corrugations partially against a cylindrical sleeve member 56 and partially against a series of circumferentially spaced, axial tubes 57 of rigid construction. The ends of the sleeve member are brazed to annular support members 58, 59 which also receive the ends of the tubes 57.

A narrow passage 60 (upper half of FIG. 2) enables the reservoir to communicate, via a number of inclined passages 60a in the lower support member 59 and a small number of the tubes 57, with an annular duct 61 which surrounds the drilling fluid main duct 51 and leads to a chamber in the ram assembly below the ram piston. The passages 60a communicate at their lower ends with an oil sump below the ram assembly.

Some of the drilling fluid being pumped down the duct 51 enters the upper support member 58 via a number of short passages 62 (lower half of FIG. 2) and thence enters the upstream ends of the remaining tubes 57 which do not transfer oil. These remaining tubes are provided with upper and lower ports 63 so that drilling fluid can leave the tubes via the upper ports to enter the space between the tubes and then re-enter the tubes through the lower ports, finally escaping through the lower ends of the tubes to rejoin the main flow of drilling fluid. The pressure of the drilling fluid in the space between the tubes acts against the the flexible wall 54, urging it outwards towards the casing 53 and so tending to squeeze the oil in the reservoir 50 downwards through the passage 60 and then upwards through the passages 60a, oil transfer tubes 57 and duct 61 to the ram operating chamber, in order to replace oil which may be lost in operation. If the reservoir is emptied, the drilling fluid will press the wall 54 against the casing, but since the passage 60 is of such restricted cross-section the danger of a local portion of the wall being forced into the passage is prevented and so damage is avoided.

A valve unit 64 substantially as illustrated in FIG. 1 is provided in a cup-like recess 65 formed in the upper support member 58, the passages 11, 12 of the earlier figure being represented by a ported tube 57 and passages 62 respectively, whilst the oil inlet passage 21 is represented by a passage 66. An O-ring 67 seals off the oil duct 61 from the passage 66 so that the valve unit 64 constitutes a pressure-relieving device in communication with the reservoir.

In operation, should oil pressure in the oil transfer system between the reservoir and the associated ram chamber exceed a predetermined value, e.g. due to over-priming with oil or to thermal expansion, the oil pressure may be relieved by an escape of oil past the upstream metal relief valve member 17 and past the downstream O-ring relief valve member 25. In the case where the apparatus is being lowered into a borehole already containing drilling mud, the latter is forced upwards inside the apparatus and past the valve unit. Since such mud normally contains abrasive and clogging matter which would interfere with the operation of the precision relief valve constituted by the relief valve member 17 and its seat, it is necessary to protect that valve from contact with the mud.

As in FIG. 1 the metal valve is protected firstly by the downstream O-ring valve member and secondly by the bath of oil maintained between both valves. If the mud pressure rises, it will temporarily tend to press the O-ring valve member more firmly against its seat but since the same pressure is applied to the oil in the adjacent reservoir the oil pressure within the valve unit will become substantially the same and will oppose distortion of the O-ring against its seat by the external mud pressure, thus protecting the O-ring valve. Should a grit particle get under the O-ring valve the latter may locally deform over it and thus reduce the possibility of damage to its metal seat.

If additional loading is desired on the O-ring valve member 25 in FIG. 1 or FIG. 2, a concentric stressed rubber ring or rings may be fitted around it.

The downstream end portion of the valve unit which carries the rubber ring relief valve may be repeated to provide a number of such valves in series, each space 23 communicating downstream with a cup-like member which overlaps it with radial clearance and contains radial outlets guarded by a rubber ring relief valve, the members being secured together by radially facing screw threads at their upstream ends.

We claim:
1. Apparatus including a duct for abrasive or otherwise objectionable fluid, a reservoir for a second fluid which may become overpressurized, a passage in flow connection with the reservoir and opening into the duct, the passage containing, in series away from the duct, a one-way valve having a valve member constituted by an annulus of stretched elastomer, a space, and a pressure relief valve, both valves arranged to exhaust towards the duct when the second fluid becomes overpressurized, the one-way valve member being operative to prevent the abrasive or otherwise objectionable fluid from contacting the pressure relief valve, and the pressure-relief valve comprising a rigid seat, a rigid valve member, and a spring urging the valve member against the seat.

2. Apparatus according to claim 1, including a cup-shaped member having a wall and a closed end, the pressure relief valve being housed therein, the space being defined between the wall, the pressure relief valve and the closed end, the cup-shaped member having a groove formed around the circumference of its wall, and at least one aperture in the wall which connects the groove with the space, the annulus being located in the groove to constitute the valve member of the one-way valve.

3. Apparatus acocrding to claim 2, in which the groove is of rectangular section and the aperture extends from the base thereof.

4. Apparatus according to claim 1, in which the spring is located in the space.

References Cited

UNITED STATES PATENTS

| 668,405 | 2/1901 | Holden. | |
| 810,502 | 1/1906 | Nolan et al. | 137—512.3 XR |
| 1,881,258 | 10/1932 | Bayles | 173—71 XR |
| 2,306,012 | 12/1942 | Campbell | 137—512 |
| 3,363,644 | 1/1968 | Malec | 137—525 XR |

ROBERT G. NILSON, Primary Examiner

U.S. Cl. X.R.

137—525